(12) United States Patent
Prevotat

(10) Patent No.: US 7,390,455 B2
(45) Date of Patent: Jun. 24, 2008

(54) METHOD FOR CONTINUOUSLY PRODUCING PLASTIC TUBES BY BIAXIAL DRAWING AND A PRODUCTION LINE FOR CARRYING OUT SAID METHOD

(75) Inventor: Bernard Prevotat, Marnes la Coquette (FR)

(73) Assignee: Alphacan, la Celle Saint-Cloud (FR)

( * ) Notice: Subject to any disclaimer, the term of this patent is extended or adjusted under 35 U.S.C. 154(b) by 0 days.

(21) Appl. No.: 10/548,103

(22) PCT Filed: Mar. 3, 2004

(86) PCT No.: PCT/FR2004/000501

§ 371 (c)(1),
(2), (4) Date: Jun. 23, 2006

(87) PCT Pub. No.: WO2004/080682

PCT Pub. Date: Sep. 23, 2004

(65) Prior Publication Data

US 2006/0255497 A1    Nov. 16, 2006

(30) Foreign Application Priority Data

Mar. 7, 2003    (FR) .................................. 03 02824

(51) Int. Cl.
*B29C 44/30* (2006.01)
*B29C 49/10* (2006.01)
*B29C 55/26* (2006.01)

(52) U.S. Cl. ..................... 264/566; 264/209.3; 425/149; 425/326.1; 425/387.1

(58) Field of Classification Search ................. 264/566, 264/209.3; 425/149, 326.1, 387.1
See application file for complete search history.

(56) References Cited

U.S. PATENT DOCUMENTS

| 2,519,375 | A | * | 8/1950 | Jargstorff et al. ............ 264/558 |
| 3,772,118 | A | | 11/1973 | Walter |
| 3,812,230 | A | * | 5/1974 | Takahashi ................... 264/519 |
| 4,189,288 | A | | 2/1980 | Halter |
| 4,472,343 | A | | 9/1984 | Kawamura et al. |
| 4,749,346 | A | | 6/1988 | Planeta |
| 4,818,467 | A | | 4/1989 | Audureau et al. |
| 2003/0141617 | A1 | | 7/2003 | Prevotat et al. |

FOREIGN PATENT DOCUMENTS

WO    WO 01/72499    10/2001

* cited by examiner

*Primary Examiner*—Suzanne E. McDowell
(74) *Attorney, Agent, or Firm*—Millen, White, Zelano & Branigan, P.C.

(57) ABSTRACT

The invention relates to a method for continuously producing plastic tubes by biaxial drawing consisting in producing a blank (E) by extrusion, heating said blank to a molecular condensation temperature, radially dilating it by the internal pressure of a fluid applied between two axially distant obturator rings (7, 11) and in carrying out a calibration (8) and cooling (9) associated with an axial tension produced on a tube at the output thereof. A pressure opposite to the internal pressure is applied to the blank wall from the outside in at least one area which is exposed to the radial dilation. Said opposite pressure is selected such that it is lower than the internal pressure, thereby preventing a counteraction to said dilation and remaining sufficient in order to control the dilation growth in such a way that it is possible to ensure a substantially constant material thickness on the same circumference.

19 Claims, 2 Drawing Sheets

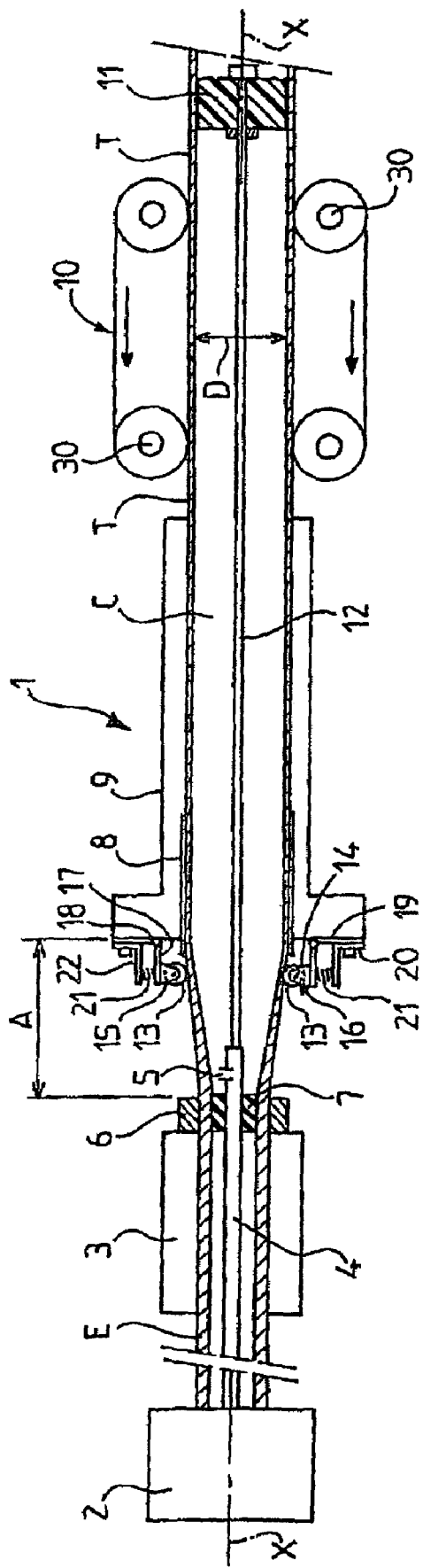
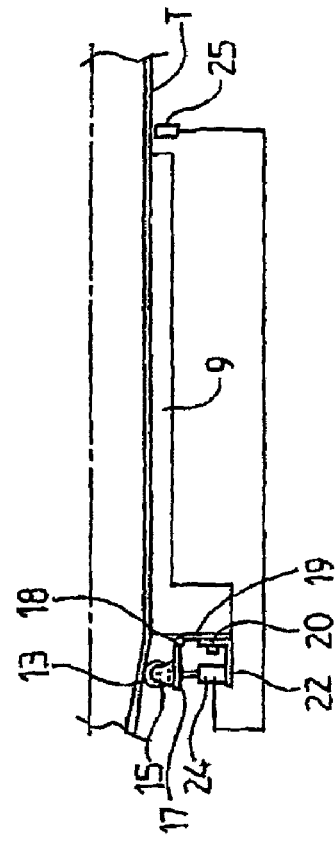
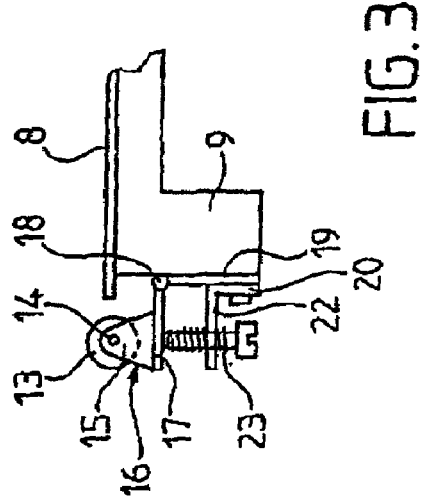

METHOD FOR CONTINUOUSLY PRODUCING PLASTIC TUBES BY BIAXIAL DRAWING AND A PRODUCTION LINE FOR CARRYING OUT SAID METHOD

The invention relates to a method for the continuous production of plastic tubes with biaxial drawing, whereby a blank is produced by extrusion, this blank is brought to molecular orientation temperature, it is made to undergo radial expansion by subjecting it to an internal fluid pressure applied between two axially distant obturators, and is sized and cooled while at the same time exerting axial tension on the exiting tube.

It is known that the final properties of the material of the tube depend on the radial expansion. For a given outside diameter and a given thickness of the blank, the greater the radial expansion, the better the mechanical properties of the material of the finished tube. However, with relatively substantial radial expansion, variations in thickness over the same circumference may arise in the finished tube, and this corresponds to eccentricity in this tube. Furthermore, variable longitudinal elongations may arise, and this is not compatible with the specifications of the product.

FR-A-2 806 956 in the name of the Applicant company, relates to a method for the continuous production of plastic tubes of the kind defined hereinabove.

U.S. Pat. No. 5, 948, 332, which corresponds to WO 95/25627, also relates to a method for the continuous production of plastic tubes with biaxial drawing, but the radial expansion of the blank is obtained by passing this blank constantly over a mandrel. To ensure certain uniformity in the thickness of the tube across its entire cross section, that document anticipates means for regulating the resistive force encountered by the tube as it passes over the mandrel. These means involve heating panels arranged in sectors around the blank and an automatic-control system sensitive to a finished-tube thickness measurement. The variation in the temperature of the heating panels is commanded according to the sectors. This installation is complicated and the use of heating panels acting from the outside does not lead to uniform material properties throughout the thickness of the wall. The response time, when modifications are commanded, is relatively lengthy because of the time taken for heat exchange operations.

It is above all an object of the invention to provide a method for the continuous production of plastic tubes that makes it possible to eliminate or at least significantly reduce the eccentricity of the finished tube and the variations in longitudinal elongation, even when there is a relatively large amount of radial expansion.

According to the invention, a method for the continuous production of plastic tubes with biaxial drawing, of the kind defined hereinabove, is characterized in that a pressure antagonistic to the internal pressure is applied from the outside against the wall of the blank in at least one region subjected to the radial expansion, this antagonistic pressure being lower than the internal pressure so as not to impede the expansion, but being high enough to ensure a controlled increase in the expansion, with a more or less constant material thickness over the same circumference.

The antagonistic pressure may be applied only to the localized regions most susceptible to an uncontrolled increase in the absence of this antagonistic pressure.

The antagonistic pressure may be exerted mechanically.

This pressure is advantageously exerted at the entry to the sizing device.

The invention also relates to a production line for implementing the method defined hereinabove, comprising: an extruder for forming a blank; at least one bath for bringing the blank to molecular orientation temperature; a device for radially expanding the blank; a device for sizing and a device for cooling the tube, and at least one downstream pulling machine at the tube exit, this installation being characterized in that it comprises, in the radial expansion region, means for exerting an antagonistic pressure against the exterior wall of the blank.

Advantageously, the means for exerting the antagonistic pressure against the exterior wall of the blank are mechanical means.

These mechanical means may consist of rollers, or wheels, advantageously having a tread strip made of plastic. The axle of a roller may be supported by a bracket mounted to rotate about an axle orthogonal to the longitudinal direction of the tube. The roller may be pressed by an elastic means or by a set screw against the wall of the blank.

Four rollers distributed around the circumference may be provided for an average tube diameter. For larger diameters, six rollers or even more may be provided, distributed about the circumference.

Advantageously, an automatic-control device is provided for modulating the antagonistic pressure according to the tube thickness measured downstream.

Apart from the measures explained hereinabove, the invention consists in a certain number of other measures that will be expanded upon hereinafter with regard to some exemplary embodiments described in detail with reference to the attached drawings, but which are not in any way limiting. In these drawings:

FIG. 1 is a cross-sectional diagram of part of a production line employing the method of the invention.

FIG. 3 is a diagram of an alternative form of embodiment of the means for exerting the antagonistic thrust;

FIG. 4 is a diagram of another alternative form of embodiment of the means for exerting the antagonistic thrust.

Figure 2:
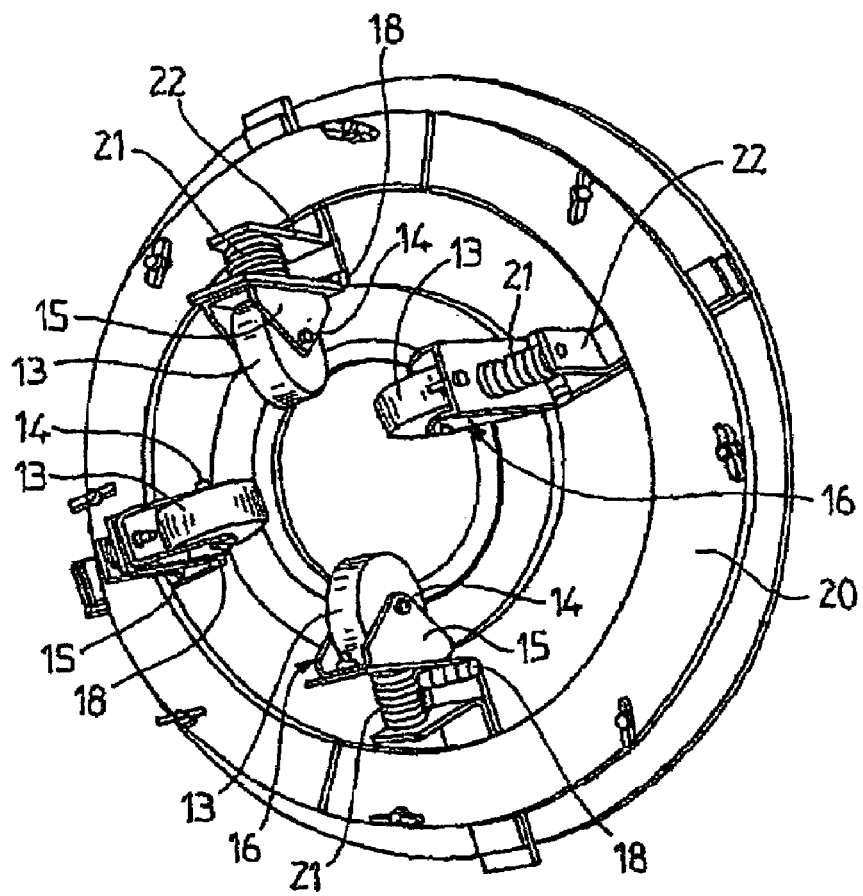
FIG. 2 is a perspective view of the entry to the sizing device equipped with rollers for exerting the antagonistic pressure.

With reference to the drawings, particularly to FIG. 1, it is possible to see a production line 1 employing the method of the invention. Production is continuous from upstream, to the left in FIG. 1, to downstream, to the right in FIG. 1.

The production line comprises, in a way known for example from FR-A-2 806 956, an assembly 2 schematically depicted and comprising an extruder fed with thermoplastic material from a feed hopper. A tube blank E leaves at a relatively high temperature, of the order of 150° C. or more, and passes through one or several cooling baths such as 3, generally containing water, so as to appreciably lower the temperature of the blank E.

A metal tube 4, coaxial with the blank E, is fixed to the extruder and extends to the right in FIG. 1. This tube 4 comprises, toward its closed axial end furthest from the extruder, at least one radial opening 5.

The temperature-controlled last bath 3, that is to say the one situated furthest to the right in FIG. 1, is designed to bring the blank E to a temperature lying within the range of molecular orientation temperatures. In the case of PVC, this temperature is in a range from 90° C. to 110° C.

Fixed to the exit of the bath 3 is a ring 6 allowing the blank to be pressed on an internal plug 7 fitted around the tube 6, upstream of the opening or openings 5.

The blank E finds itself in the open air in a region A situated axially between the ring 6 and the entry to a sizing device 8 depicted schematically. This sizing device 8 is arranged in a cooling bath 9, for example involving showering water under vacuum. At the exit from the bath 9, the tube T, in the finished state, passes into a pulling machine 10 which exerts the tensile force needed on the entire line to pull the tube and the blank along.

Under continuous operating conditions, a downstream plug 11 is attached, for example by a cable 12, to the closed end of the tube 4. The internal plug 7 and the plug 11 constitute two axially distant obturators defining a closed chamber C into which a pressurized fluid, preferably air, is introduced via the pipe 4 and the orifice 5.

The internal pressure of the fluid causes the blank to expand radially at the exit of the ring 6 to reach the internal diameter of the sizing device 8 as illustrated schematically in FIG. 1, when the steady state is established.

In the transient start-up phase, the procedure followed may be as described in FR-A-2 806 956.

The final properties of the material of the tube T depend on the radial expansion of the blank between the ring 6 and the sizing device 8. The greater this radial expansion, the better the mechanical properties of the material of the tube.

However, it has been found that, beyond a certain radial expansion ratio, the "bubble" generated in the region A deforms and loses its symmetry of revolution about its geometric axis. This results in eccentricity of the final tube, with different thicknesses over the same circumference, and variable longitudinal elongations that are not compatible with the specifications of the product.

Figure 5:
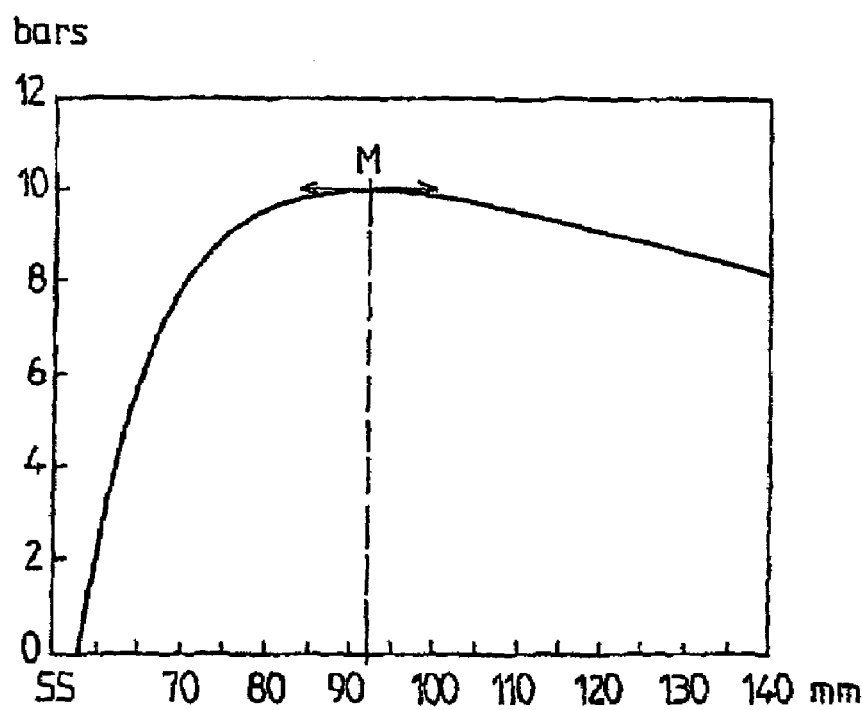
FIG. 5 is a curve representing the increase in diameter of a tube, on the abscissa axis, and expressed in millimeters, as a function of the internal pressure, expressed in bars, on the ordinate axis.

These experimental observations have been explained using the diagram of FIG. 5 illustrating the variation in outside diameter of a blank E with respect to the internal pressure in bars. The blank considered has an outside diameter of about 58 mm when its internal gauge pressure is zero. Of cause, the explanations are valid for different diameters.

The curve of FIG. 5 passes through a maximum M, with a tangent parallel to the abscissa axis, for an outside diameter of about 92 mm and an internal pressure of 10 bars. For diameters smaller than the diameter corresponding to the point M, the pressure/deformation relationship is an increasing one. Beyond the point M, the pressure/deformation relationship becomes a decreasing relationship. This phenomenon is associated mainly with a stretching of the material beyond the yield point. This results in a kind of unstable and uncontrolled phase. The internal pressure that needed to be applied in order to inflate the blank to the maximum M, corresponding to the yield point, becomes higher than the pressure that allows the material to continue to elongate radially.

For diameters beyond the diameter corresponding to the point M, the increase in the bubble is not well controlled, and this explains the asymmetric deformation of the cross section.

In order to overcome this obstacle and, in particular, in order to be able to benefit from a radial expansion ratio greater than that corresponding to the point M, without thereby creating differences in thickness around the circular cross section, the invention anticipates reducing the stress in the wall of the blank by applying, from the outside, an antagonistic pressure, or counterpressure, which subtracts from the internal pressure.

One simple solution is to apply the antagonistic pressure mechanically using rollers 13 arranged at the entry to the sizing device 8. As a preference, the tread strip of the rollers 13 is made of plastic. The rotation axle 14 of the rollers is orthogonal to the geometric axis X-X of the blank E. The axle 14 (FIG. 2) is supported, at each end, by a bearing housed in a cheek 15 of a clevis 16 sitting over the roller 13 on the opposite side to the blank. The clevis 16 is fixed to a mounting plate 17 more or less parallel to the geometric axis X-X of the blank E. The mounting plate 17 is articulated at its end furthest from the roller 13, and close to the sizing device 8, on a transverse axle 18 orthogonal to the geometric axis X-X of the blank. The axle 18 is supported by a plate 19 the plane of which is perpendicular to the axis X-X. The plate 19 is pressed against the entry face of the sizing device 8 or of the bath 9, for example being clamped using an annulus 20 (FIG. 2) pressed by screws against the inlet face. By slackening off the annulus 20, it is possible to set the angular position of the plates 19 about the geometric axis X-X.

The roller 13 and the mounting plate 17 are advantageously subjected to the thrust of a compression spring 21, in the direction of the geometric axis X-X. This spring 21 rests, at one end, against the opposite face of the mounting plate 17 to the roller 13 and, at its other end, against a blade 22 fixed to the plate 19.

As a variant, as illustrated in FIG. 3, the spring 21 may be replaced by a set screw 23 engaged in a threaded hole in the blade 22 and pressing against the mounting plate 17. The pressure exerted by the roller 13 is adjusted by tightening or slackening the screw 23.

According to an alternative form illustrated in FIG. 4, the spring 21 may be replaced by a pneumatic or hydraulic ram 24 the fluid pressure of which is automatically controlled to suit the thickness of the tube T. This thickness is detected by a sensor 25, particularly an ultrasound sensor situated, for example, at the exit from the cooling bath 9. The ram 24 is arranged, like the spring 21, between the blade 22 and the mounting plate 17. The ram 24 presses the roller 13 against the wall of the bubble with a pressure that is dependent on the exit thickness, so as to keep this thickness at the desired value. This alternative form allows the continuous production of a tube to be regulated automatically with minimum eccentricity.

According to another alternative form that has not been depicted, the rollers 13 may be replaced by simple fingers with rounded ends, and made of a material with a low coefficient of friction, pressing against the external wall of the blank E. According to yet another possibility, the exterior antagonistic pressure would be exerted using a fluid acting against regions of the exterior wall of the blank.

The antagonistic pressure, or counterpressure, may be localized in the regions of uncontrolled growth of the bubble. By virtue of the consistency and rigidity of the material, it is possible to limit the regions of intervention to a small number dependent on the diameter of the tube.

In the example illustrated in FIG. 2, the rollers 13 are provided in four regions more or less at right angles. Such a solution may apply to a blank with a bubble diameter (diameter at the entry to the sizing device 8) of the order of 100 mm. According to FIG. 2, the four rollers 13 have been installed on each of the top, bottom, right and left generatrices of the blank. When the bubble is inflated, these rollers 13 are positioned in contact with the material. The thickness of the biorientated tube on the four generatrices corresponding to the rollers 13 is measured downstream and compared with target values from the specification sheet. A pressure, for example a manually regulated pressure, is then applied to the wall of the bubble via this system on the generatrix or generatrices in contact with the roller.

For a diameter of the order of 200 mm, six regions with counterpressure rollers are preferably provided.

The exterior counterpressure needs to be applied in such a way as to generate practically no friction and no localized cooling of the surface layer of the wall of the tube.

It would be possible to anticipate having each roller supported by an annulus mounted to rotate about the axis X-X, and for the angular position of the roller about the axis X-X to be automatically controlled as a function of the angular position of a variation in thickness detected by the sensors 25 distributed around the tube T.

The operation of the production line and more particularly of the counterpressure means formed by the rollers 13 is evident from the foregoing explanations.

According to the invention, a practically uniform thickness can be ensured on all the circular sections of a tube, even if it has undergone radial expansion beyond the point M (FIG. 5). Starting out from a blank of given outside diameter, the possibilities for final outside diameter are thus broadened. In particular, it is possible to obtain tubes of a superior class (the level of class depends on the relative increase in the diameter of the blank) with superior mechanical properties.

By way of nonlimiting indication, the fluctuation in the thickness of a tube in a circular section which may range from 0.3 to 0.5 mm for a tube of about 100 mm diameter according to a method of the state of the art is reduced to less than 0.1 mm with the invention.

The invention claimed is:

1. In a method for the continuous extrusion of a plastic tube with biaxial drawing, whereby a tubular blank (E) is produced by extrusion through a die, said tubular blank is brought to molecular orientation temperature, is made to undergo radial expansion by subjecting it to an internal fluid pressure applied between two axially distant obturators (7, 11), and is sized (8) and cooled (9) while at the same time exerting axial tension on the exiting tube resulting in a tube having a larger diameter than the extruded blank, the improvement comprising applying a counterpressure against the exterior wall of the tubular blank in at least one region subjected to the radial expansion and only to the localized regions most susceptible to an uncontrolled increase in the absence of counterpressure, said counterpressure being lower than the internal pressure so as not to impede the expansion, but being high enough to ensure a controlled increase in the expansion, resulting in a substantially uniform peripheral thickness of the wall throughout the length of the resultant tube.

2. The method as claimed in claim 1, wherein the counterpressure is exerted upstream of the sizing step (8).

3. The method as claimed in claim 2, wherein the counterpressure is exerted by a mechanical contact pressing directly against the outside wall of the blank.

4. A method according to claim 2, wherein the counterpressure is applied proximate to the entry of the tube into the sizing step.

5. A method according to claim 1, wherein said plastic tube is susceptible to an internal pressure which results in an expansion of the tube exceeding stretching yield point M and wherein the applied counterpressure results in a net expansion pressure on the tube which is below said stretching yield point M.

6. A method according to claim 5, wherein said tube has a circular cross section.

7. A method according to claim 5, comprising expanding the tube beyond the stretching yield point M associated with only the internal pressure.

8. A method according to claim 1, wherein said tube has a circular cross section.

9. A method according to claim 1, wherein compressed air constitutes said internal fluid pressure.

10. A method for the continuous extrusion of a plastic tube with biaxial drawing, whereby a tubular blank (E) is produced by extrusion through a die, said tubular blank is brought to molecular orientation temperature, is made to undergo radial expansion by subjecting it to an internal fluid pressure applied between two axially distant obturators (7, 11), and is sized (8) and cooled (9) while at the same time exerting axial tension on the exiting tube resulting in a tube having a larger diameter than the extruded blank, the improvement comprising applying a counterpressure against the exterior wall of the tubular blank in at least one region subjected to the radial expansion, said counterpressure being lower than the internal pressure so as not to impede the expansion, but being high enough to ensure a controlled increase in the expansion, resulting in a substantially uniform peripheral thickness of the wall throughout the length of the resultant tube, and wherein the counterpressure is exerted by a mechanical contact pressing directly against the exterior wall of the blank.

11. A method according to claim 10, wherein the counterpressure is applied proximate to the entry of the tube into the sizing step.

12. A method according to claim 11, wherein said plastic tube is susceptible to an internal pressure which results in an expansion of the tube exceeding stretching yield point M and wherein the applied counterpressure results in a net expansion pressure on the tube which is below said point M.

13. A method according to claim 10, wherein the mechanical counterpressure is applied in a manner so as to generate practically no friction.

14. In a production line for the continuous extrusion of a continuous tube with biaxial drawing comprising: an extruder (2) for forming a blank; at least one bath (3) for bringing the blank to molecular orientation temperature; a device (4, 5, 7, 11) for providing an internal fluid pressure and radially expanding the blank; a device (8) for sizing and a device (9) for cooling the tube, and at least one downstream pulling machine (10) at the tube exit, the improvement comprising, in the radial expansion region (A), mechanical means (13, 21,; 13, 23; 13, 24) for exerting a counterpressure in direct contact against the exterior wall of the blank (E).

15. The production line as claimed in claim 14, wherein the mechanical means comprise rollers (13).

16. The production line as claimed in claim 15, wherein said mechanical means comprise axles (14) for a rollers (13) said rollers (13) being supported by a bracket (16), said bracket (16) being mounted to rotate about an axle (18) orthogonal to the longitudinal direction (X-X) of the tube.

17. The production line as claimed in claim 16, further comprising an elastic means (21) for pressing the roller (13) against the exterior wall of the blank.

18. The production line as claimed in claim 16, further comprising a fluid ram (24) for pressing the roller against the exterior wall of the blank, and an automatic-control device for modulating the counterpressure according to the tube thickness measured (25) downstream.

19. The production line as claimed in claim 15, comprising at least four rollers (13) distributed about the circumference of a tube.

* * * * *